United States Patent
Anderson et al.

(10) Patent No.: US 11,090,928 B2
(45) Date of Patent: Aug. 17, 2021

(54) FLUID DISTINGUISHING DEVICES

(71) Applicant: Hewlett-Packard Development Company, L.P., Spring, TX (US)

(72) Inventors: Daryl E. Anderson, Corvallis, OR (US); Eric Martin, Corvallis, OR (US); James Michael Gardner, Corvallis, OR (US); James A. Feinn, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/763,097

(22) PCT Filed: Dec. 11, 2017

(86) PCT No.: PCT/US2017/065527
§ 371 (c)(1),
(2) Date: May 11, 2020

(87) PCT Pub. No.: WO2019/117848
PCT Pub. Date: Jun. 20, 2019

(65) Prior Publication Data
US 2020/0391507 A1    Dec. 17, 2020

(51) Int. Cl.
*B41J 2/045* (2006.01)
*B41J 2/14* (2006.01)

(52) U.S. Cl.
CPC ......... *B41J 2/04555* (2013.01); *B41J 2/0458* (2013.01); *B41J 2/14153* (2013.01)

(58) Field of Classification Search
CPC .. B41J 2/04501; B41J 29/387; B41J 2/04555; B41J 2/14153; B41J 2/20; B41J 29/393; B41J 29/38; B41J 2/0458; G01N 27/10
See application file for complete search history.

(56) References Cited

U.S. PATENT DOCUMENTS

| | | | |
|---|---|---|---|
| 5,121,688 A * | 6/1992 | Williams | B41C 1/1033 101/142 |
| 7,681,980 B2 | 3/2010 | Cai et al. | |
| 9,156,262 B2 | 10/2015 | Taff et al. | |
| 9,599,500 B2 | 3/2017 | Ge et al. | |
| 2006/0274103 A1* | 12/2006 | Kim | B41J 2/04563 347/17 |
| 2008/0309712 A1* | 12/2008 | Silverbrook | B41J 2/1631 347/42 |
| 2013/0162702 A1* | 6/2013 | Tombs | G03G 8/00 347/1 |
| 2013/0278656 A1 | 10/2013 | Govyadinov et al. | |
| 2014/0204148 A1* | 7/2014 | Ge | B41J 2/17566 347/19 |
| 2014/0375710 A1 | 12/2014 | Blair et al. | |

FOREIGN PATENT DOCUMENTS

| | | |
|---|---|---|
| EP | 1772272 A2 | 4/2007 |
| WO | WO-2015177598 A1 | 11/2015 |
| WO | WO-2016175840 A1 | 11/2016 |

* cited by examiner

*Primary Examiner* — Kristal Feggins
(74) *Attorney, Agent, or Firm* — Fabian VanCott (57) ABSTRACT

A method of distinguishing between fluids may include providing a current to an electrode disposed within a fluidic passageway of a fluidic die, the current to be forced into a fluid within the fluidic die, sensing an impedance at the electrode, and determining a particle vehicle separation level of the fluid based on the sensed impedance between a first instance and a second instance.

15 Claims, 11 Drawing Sheets

FLUID DISTINGUISHING DEVICES

BACKGROUND

A fluidic die may be used to move fluids within the fluidic die, eject fluids onto media, or combinations thereof. The fluids within a fluidic die may include any fluid that may be moved within or ejected from the fluidic die. For example, the fluids may include inks, dyes, chemical pharmaceuticals, biological fluids, gases, and other fluids. The fluids may be used to print images on media or effectuate chemical reactions between different fluids, for example. Further, in additive manufacturing processes such as those that use a three-dimensional (3D) printing device, the fluidic die may eject build materials, adhesives, and other fluids that may be used to build a 3D object.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some fluids moved within and/or ejected from a fluidic die may include a fluid vehicle and particles where the fluid vehicle is used to carry or suspend a particle within the fluid vehicle such as pigment-based printing fluids. However, other fluids may be ejected that do not contain particles such as non-pigment based dyes. As to particle-containing fluids, these types of fluids may include, for example, a printing fluid that includes color pigments suspended in an ink vehicle. Printing systems such as inkjet printers include printheads, and the printheads include firing chambers including nozzle regions having printing fluid therein, and fluid ejectors to eject the printing fluid in the nozzle regions onto media. Over time, the color pigments in the ink vehicle located in the nozzle region may diffuse and move away from the nozzle region resulting in pigment ink vehicle separation. The separation of the pigment particles from the ink vehicle may be referred to herein as pigment ink vehicle separation or pigment vehicle separation (PIVS), or may be generically referred to herein as particle vehicle separation (PVS).

PVS may occur when a particle-containing fluid sits in a portion of the fluidic die a period of, for example, seconds or minutes without being refreshed. Due to evaporation through a nozzle, and other effects related to the fluid formulation, particles within the fluid may, over time, migrate out of a first portion of the fluidic die such as a fluid ejection chamber, and back into other fluid containing portions of the fluidic die such as a slot or shelf area. When PVS occurs, this leaves fluid in the chamber without its particle constituent. If, in the case of a pigmented ink, the pigmented ink is ejected from a nozzle in a PVS condition, a first number of ejected drops out of the nozzle will not have a correct amount or concentration of pigment particles or colorant in it, and will affect the print quality of that part of the printed image. Stated another way, as a consequence of PVS for example, ejection of the printing fluid in the nozzle region with a reduced amount of color pigments onto the media results in a reduction of image quality due to the relatively lower concentration of pigment particles in the printing fluid that do not get ejected onto the media. A resulting print on the media in a PVS situation may have a perceivable deficiency in vibrant colors and may look discolored, faded, dull, or pale. Additionally, at times, pigment ink vehicle separation may result in solidification of the printing fluid in the nozzle region. In this case, the respective nozzle region may prevent the ejection of printing fluid and reduce the lifespan of a corresponding fluid ejector.

Even though pigment inks are used herein as an example to describe a fluid vehicle and particles where the fluid vehicle is used to carry or suspend a particle within the fluid vehicle, similar fluid including particles and a fluid vehicle may be equally applicable. For example, some biological fluids such as blood may include particles suspended in a fluid vehicle. In the case of blood, blood includes bloods cells suspended in blood plasma. In this example, the blood cells may separate or diffuse where a higher concentration of blood cells exist in a first portion of the blood plasma relative to another portion of the blood plasma where there may exist a relatively lower concentration of blood cells.

Therefore, PVS may occur in a wide range of fluids that are moved within and/or ejected from a fluidic die. Detection of the separation of a particle from its fluid vehicle may allow for remedial measures to be taken to correct any particle concentration disparities within the fluid.

In contrast, non-particle-containing fluids do not suffer from PVS as they do not include particles that may separate from a fluid vehicle. Instead non-particle-containing fluids such as dyes, if tested to determine PVS, would indicate a constant particle vehicle separation value at any time since not particles are present to separate from a vehicle. Said in another manner, to discriminate between particle-containing fluids, and non-particle-containing fluids, tests may be run to first test a target fluid when it is known to be mixed, and test the target fluid after a period of time known to induce PVS in some or all particle-containing fluids. The test results will be different for particle-containing fluids, but the same for non-particle-containing fluids. Further, particle-containing fluids with differing particle mobilities may also yield different results among particle-containing fluids.

Examples described herein provide a fluidic device including a fluidic die including an electrode disposed in a fluid passageway of the fluidic die, and a controller. The controller senses an impedance at the electrode, and determines a particle vehicle separation level of a fluid within the fluidic die based on the sensed impedance between a first instance and a second instance.

The fluidic device may include a stirring actuator to stir the fluid. The controller stirs the fluid with the stirring actuator, transmits a first instance of a current to the electrode, senses a first impedance at the electrode, waits a predefined period of time, transmits a second instance of the current to the electrode, senses a second impedance at the electrode, and determines whether the first impedance and the second impedance differ by a predetermined threshold. The controller, in response to a determination that the first impedance differs from the second impedance by the predetermined threshold, determines that the fluid comprises particles within a vehicle fluid. Further, the controller, in response to a determination that the first impedance does not differ from the second impedance by the predetermined threshold, determines that the fluid does not comprise particles within a vehicle fluid.

The fluidic device may also include a stirring actuator to stir the fluid. The controller stirs the fluid with the stirring actuator, transmits a first instance of a current to the electrode, and senses a first impedance at the electrode. The controller waits a predefined period of time, transmits a second instance of the current to the electrode, senses a second impedance at the electrode, and determines whether the first impedance is within a first range and the second impedance is within a second range in accordance with an expected fluid fingerprint. The controller also determines whether a correct fluid is present within the fluidic die based on the first range, second range and the expected fluid fingerprint.

The particle vehicle separation level of the fluid is defined by an impedance value based on the sensed impedance. A relatively lower impedance corresponds to a higher particle concentration within the fluid. A relatively higher impedance corresponds to a lower particle concentration within the fluid.

Examples described herein also provide a method of distinguishing between fluids. The method may include providing a current to an electrode disposed within a fluidic passageway of a fluidic die, the current to be forced into a fluid within the fluidic die, sensing an impedance at the electrode, and determining a particle vehicle separation level of the fluid based on the sensed impedance between a first instance and a second instance. The method may be performed during a quiescent period of the fluidic die.

Determining the particle vehicle separation level of the fluid based on the sensed impedance between a first instance and a second instance may include stirring the fluid, providing a first instance of the current to the electrode, sensing a first impedance at the electrode, waiting a predefined period of time, providing a second instance of the current to the electrode, sensing a second impedance at the electrode, and determining whether the first impedance and the second impedance differ by a predetermined threshold. In response to a determination that the first impedance differs from the second impedance by a predetermined threshold it may be determined that the fluid comprises particles within a vehicle fluid. In response to a determination that the first impedance does not differ from the second impedance by a predetermined threshold, it may be determined that the fluid does not comprise particles within a vehicle fluid.

Determining the particle vehicle separation level of the fluid based on the sensed impedance between a first instance and a second instance may include stirring the fluid, providing a first instance of the current to the electrode, sensing a first impedance at the electrode, waiting a predefined period of time, providing a second instance of the current to the electrode, and sensing a second impedance at the electrode. Determining the particle vehicle separation level of the fluid based on the sensed impedance between a first instance and a second instance may also include determining whether the first impedance is within a first range and the second impedance is within a second range in accordance with an expected fluid fingerprint, and determining whether a correct fluid is present within the fluidic die based on the first range, second range and the expected fluid fingerprint.

The particle vehicle separation level of the fluid may be defined by an impedance value based on the sensed impedance. A relatively lower impedance corresponds to a higher particle concentration within the fluid, and a relatively higher impedance corresponds to a lower particle concentration within the fluid.

Examples described herein also provide a computer program product for distinguishing between fluids. The computer program product may include a computer readable storage medium including computer usable program code embodied therewith. The computer usable program code may, when executed by a processor, provide a first current instance to an electrode disposed within a fluidic passageway of a fluidic die, sense a first impedance at the electrode, provide a second current instance to an electrode disposed within a fluidic passageway of a fluidic die, sense a second impedance at the electrode, and determine a particle vehicle separation level of the fluid based on the first sensed impedance and the second sensed impedance. The processor may execute the computer usable program code during a quiescent period of the fluidic die.

Determining the particle vehicle separation level of the fluid based on the first sensed impedance and the second sensed impedance may include stirring the fluid, providing the first current instance to the electrode, sensing the first impedance at the electrode, waiting a predefined period of time, providing the second current instance to the electrode, sensing the second impedance at the electrode, and determining whether the first impedance and the second impedance differ by a predetermined threshold. In response to a determination that the first impedance differs from the second impedance by a predetermined threshold, it may be determined that the fluid comprises particles within a vehicle fluid. In response to a determination that the first impedance does not differ from the second impedance by a predetermined threshold, it may be determined that the fluid does not comprise particles within a vehicle fluid.

The particle vehicle separation level of the fluid may be defined by an impedance value based on the first and second sensed impedances. A relatively lower impedance indicates a lack of particle vehicle separation, and a relatively higher impedance indicates particle vehicle separation. In some examples, a relatively lower impedance corresponds to a lower particle concentration within the fluid, and a relatively higher impedance corresponds to a higher particle concentration within the fluid.

Examples described herein also provide a fluidic cartridge. The fluidic cartridge may include a fluid reservoir for storing a volume of fluid, a fluidic die fluidically coupled to the fluid reservoir, an electrode disposed within a fluidic passageway of the fluidic die, and control circuitry. The control circuitry may activate the electrode within the fluidic die, and determine a particle vehicle separation level of the fluid based on the sensed impedance between a first instance and a second instance. The impedance sensed at the electrode corresponds to a dispersion level of a solid within a fluid vehicle of the fluid. The fluidic passageway is a fluid ejection chamber, a fluid channel, or combinations thereof. The fluidic cartridge may include a stirring device to stir the fluid within the fluidic die before the first instance. In response to a determination that the first impedance differs from the second impedance by a predetermined threshold, it may be determined that the fluid includes particles within a vehicle fluid. In response to a determination that the first impedance does not differ from the second impedance by a predetermined threshold, it may be determined that the fluid does not include particles within a vehicle fluid.

Figure 1A:
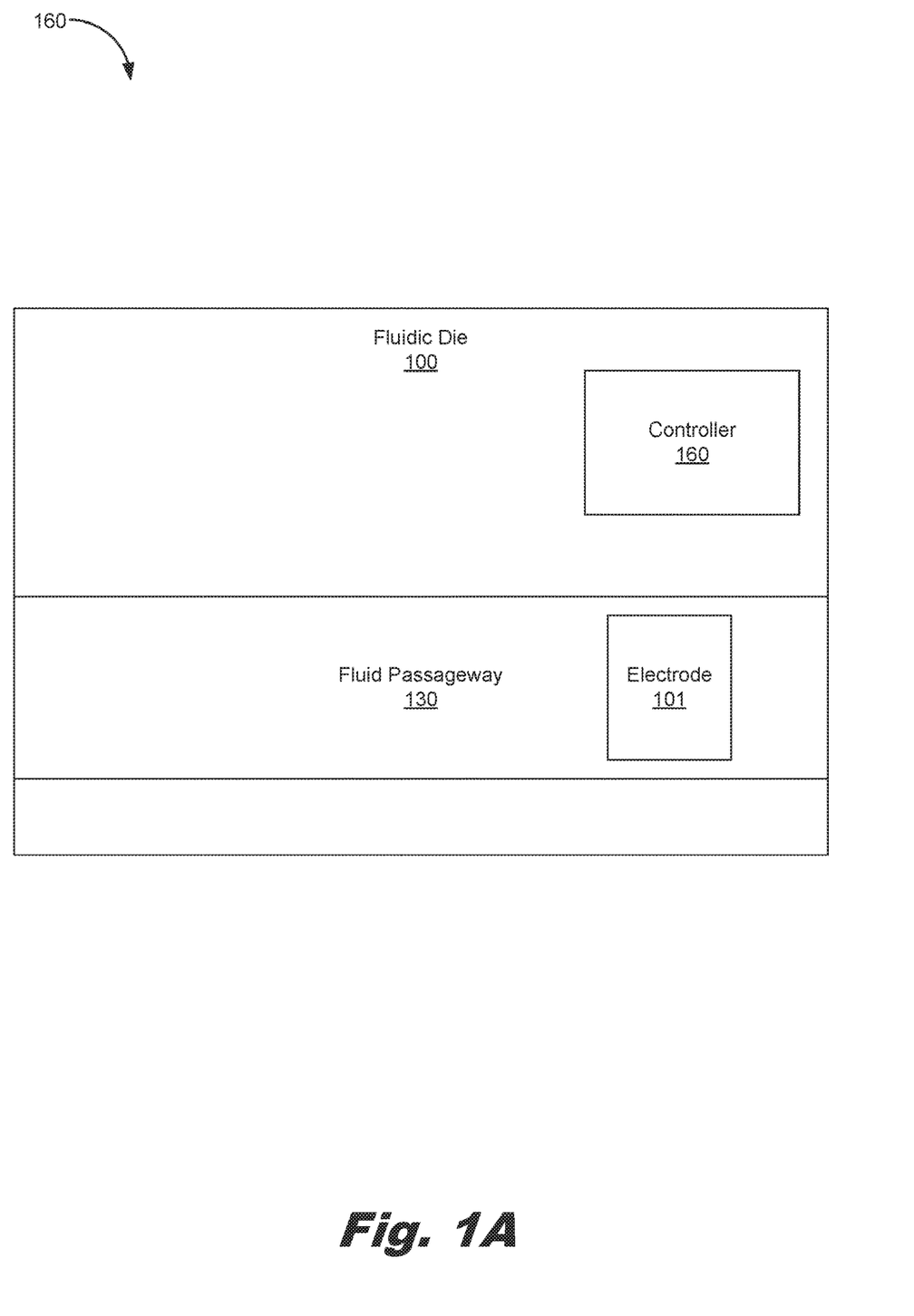
FIG. 1A is a block diagram of a fluidic device including an electrode used in fluid particle concentration detection, according to an example of the principles described herein.

Turning now to the figures, FIG. 1A is a block diagram of a fluidic device (160) including an electrode (101) used in fluid particle concentration detection, according to an example of the principles described herein. The fluidic device (160) may include a fluidic die (100). The fluidic die (100) may include a number of electrodes (101) disposed in a fluid passageway (130) of the fluidic die (100). The fluidic device (160) may also include a controller (160) to sense an impedance at the electrode (101), and determine a particle vehicle separation level of a fluid within the fluidic die (100) based on the sensed impedance between a first instance and a second instance.

Figure 1B:
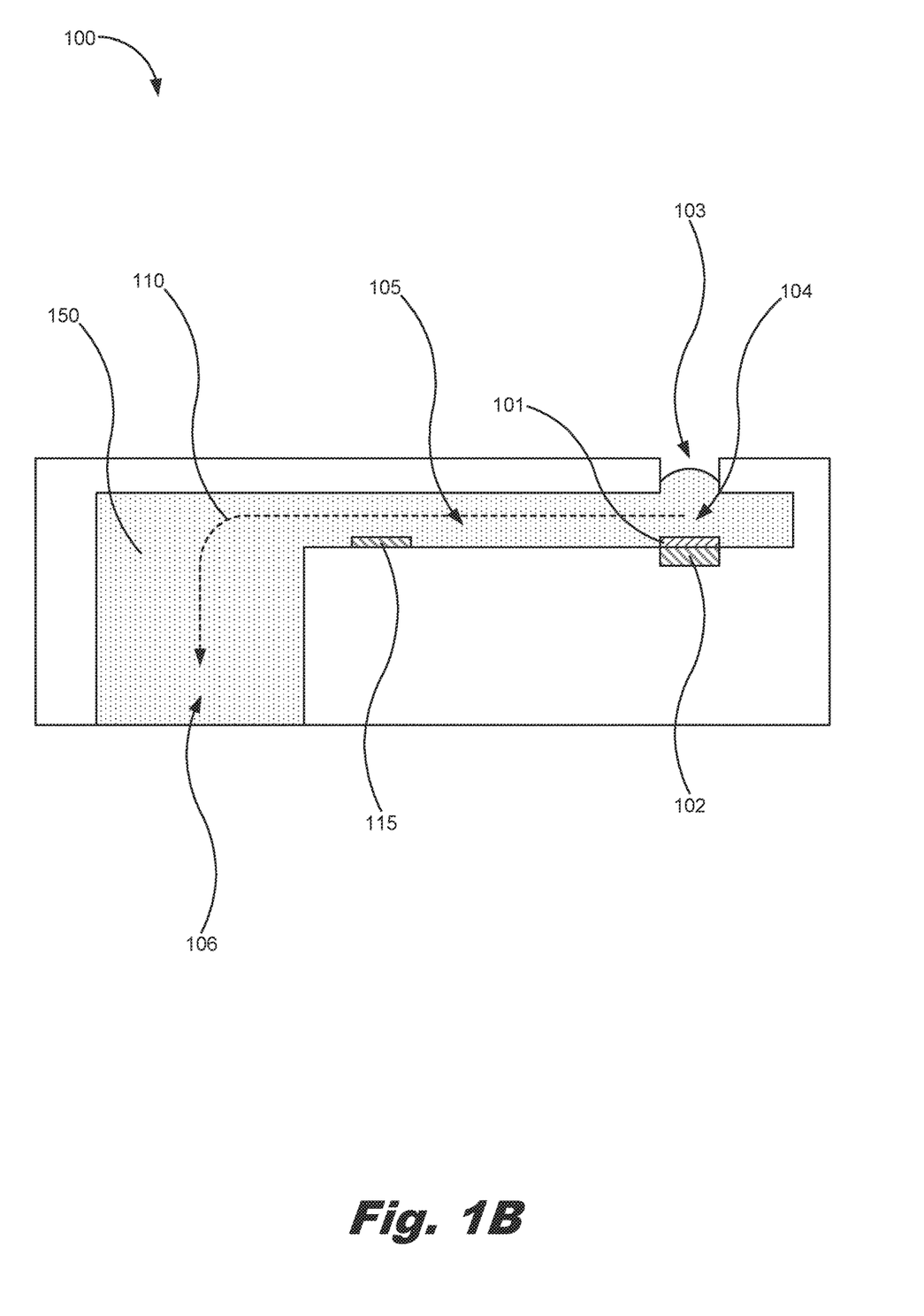
FIG. 1B is a block diagram of a portion of a fluidic die including an electrode used in fluid particle concentration detection, according to an example of the principles described herein.

FIG. 1B is a block diagram of a portion of a fluidic die (100) including an electrode (101) used in fluid particle concentration detection, according to an example of the principles described herein. The fluidic die (100) may include a number of passageways, channels, and chambers in which the fluid (150) circulates or moves. In one example, a number of fluid slots (106) may be used to deliver fluid to a number of fluid channels (105) and into a number of fluid ejection chambers (104).

Each of the fluid ejection chambers (104) may include an actuator (102) used to eject a volume of the fluid (150) from the ejection chamber (104), out a nozzle (103), and onto a media, for example. The actuator (102) is electrically insulated and isolated from the electrode (101) The actuators (102) may be, for example, thermal heating devices used to form a drive bubble of vaporized fluid separated from liquid fluid by a bubble wall. The drive bubble may be used to force the fluid from the fluid ejection chamber (104) and out the nozzle (103). Once the drive bubble collapses, additional fluid from a reservoir may flow into the fluid slots (106), fluid channels (105), and fluid ejection chambers (104), replenishing the lost fluid volume from the creation of the drive bubble and the ejection of the fluid. This process may be repeated each time the fluidic die (100) is instructed to eject fluid. In another example, the actuators (102) may be piezoelectric actuators to generate a pressure pulse that forces a volume of the fluid out of the nozzle (103). In this example, the piezoelectric actuators may include a piezoelectric material that has a polarization orientation that provides a motion into the fluid ejection chambers (104) when and electrical charge is applied to the piezoelectric material.

The fluidic die (100) may also include an electrode (101) used to detect the concentration of particles within the fluid. In one example, the electrode (101) may be placed above the actuator (102) as depicted in FIG. 1B. However, the electrode (101) may be placed anywhere within the fluidic die (100) including, for example, the fluid slots (106), the fluid channels (105), other areas within the fluid ejection chambers (104), other fluidic passageways within the fluidic die (100), or combinations thereof. The electrode (101) is electrically coupled to control circuitry associated with the fluidic die (100) to allow for the control circuitry to actuate the electrode when a particle concentration of the fluid is to be determined. Particles within fluids may be charged particles or charge accepting particles that are detectable through a signal or other electrical charge forced into the fluid. The charged or chargeable properties of the particles within the fluid (150) may be used to detect a concentration of the particles within the fluid (150).

A current may be applied to the electrode (101) when a fluid particle concentration is to be detected, and a voltage may be measured. Conversely, in another example, a voltage may be applied to the electrode (101) when a fluid particle concentration is to be detected, and a current may be measured. A voltage may be applied to the electrode (101) when a fluid particle concentration is to be detected. In this example, the voltage applied to the electrode (101) may be a non-nucleating and non-drive-bubble-forming fire pulse. In contrast, when a portion of the fluid (150) is to be ejected from the fluidic die (100), the actuator (102) may be actuated to create a drive bubble as described herein. Thus, a fixed current may be applied to the fluid (150) surrounding the electrode (101), and a resulting voltage at the electrode (101) may be sensed. The sensed voltage may be used to determine an impedance of the fluid (150) surrounding the electrode (101) at that area within the fluidic die (100) at which the electrode (101) is located. Electrical impedance is a measure of the opposition that the circuit formed from the electrode (101) and the fluid (150) presents to a current when a voltage is applied to the electrode (101), and may be represented as follows:

$$Z = \frac{V}{I} \qquad \text{Eq. 1}$$

where Z is the impedance in ohms (Ω), V is the voltage applied to the electrode (101), and I is the current applied to the fluid (150) surrounding the electrode (101). In another example, the impedance may be complex in nature, such that there may be a capacitive element to the impedance where the fluid may act partially like a capacitor. A measured capacitance in this example may change with the properties of the fluid such as particle concentration.

The detected impedance (Z) is corresponds to a particle concentration in the fluid (150). Stated in another way, the impedance (Z) is proportional or corresponds to a dispersion level of the particles within the fluid vehicle of the fluid. In one example, if the impedance is relatively lower, this indicates that a higher particle concentration exists within the fluid in that area at which the particle concentration is detected. Conversely, if the impedance is relatively higher, this indicates that a lower particle concentration exists within the fluid in that area at which the particle concentration is detected. Lower particle concentration within a portion the fluid may indicate that PVS has occurred in a pigment-containing fluid, and that remedial measures may be taken to ensure that the particle concentration is made homogeneous throughout all the fluid within the fluidic die (100), homogeneous throughout the fluid in the fluid slots (106), fluid channels (105), fluid ejection chambers (104) or combinations thereof, or homogeneous based on an original or manufactured homogeneity of the fluid. In some examples, a relatively lower impedance may correspond to a lower particle concentration within the fluid, and a relatively higher impedance may correspond to a higher particle concentration within the fluid. As for non-pigment-containing fluid, a detection of a constant or non-changing impedance between two separate tests may indicate that the fluid (150) is a non-pigment-containing fluid. If the impedance between the two separate tests of a non-particle-containing fluid, the impedance at least will change less than the threshold of a particle-containing fluid.

The fluidic die (100) may also include a stirring actuator (115). Any number of stirring actuators (115) may be included within the fluid slots (106), fluid channels (105), fluid ejection chambers (104), and other passageways of the fluidic die (100). In one example, at least one stirring actuator (115) may be included in a fluid channel (105) that is fluidically coupled to a fluid ejection chamber (104). The stirring actuators (115) may be any actuator that moves fluid throughout the passageways of the fluidic die (100) such as, for example, a micro-fluidic pump or other fluid pump device. The stirring actuators (115) stir the fluid (150) within the fluid ejection chamber (104) to cause the fluid (150) to return to a homogeneous state where the particle concentration of the fluid (150) throughout the fluidic die (100) is consistent.

Figure 2:
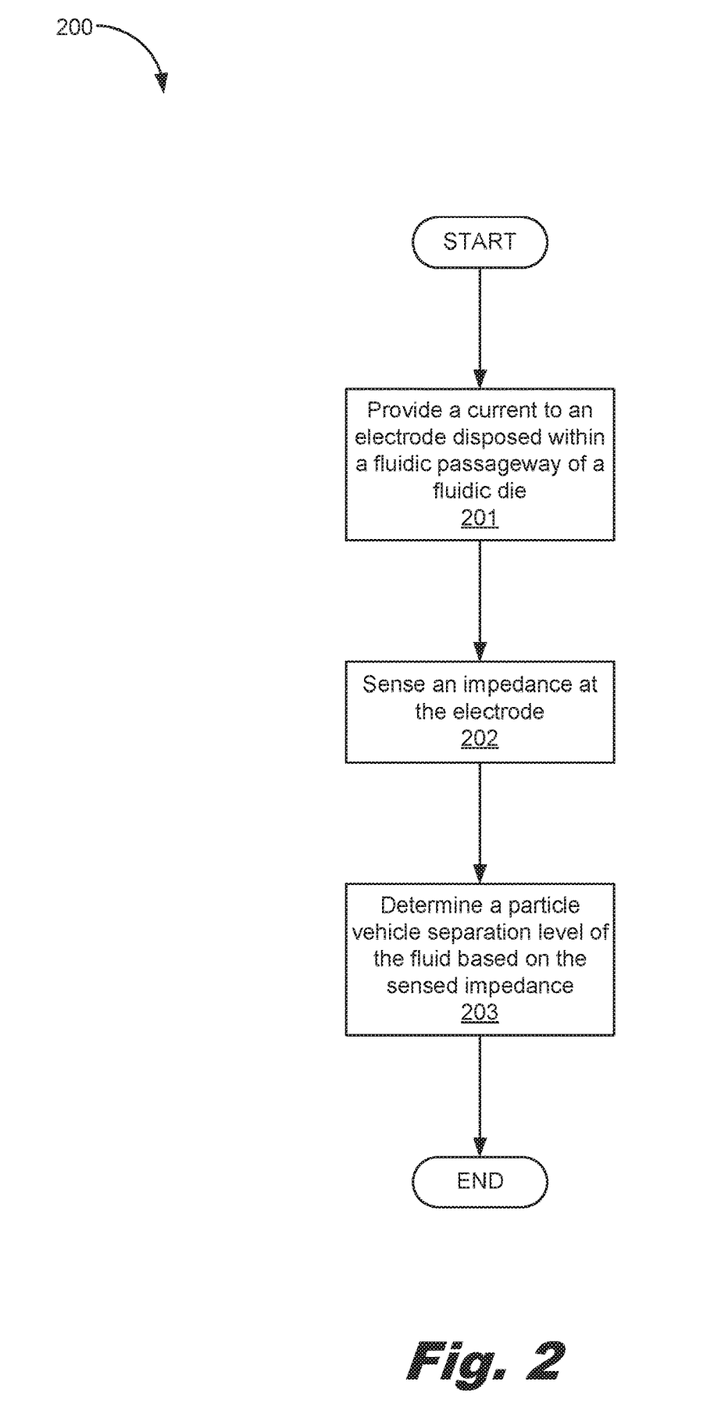
FIG. 2 is a flowchart showing a method of detecting fluid particle concentration, according to an example of the principles described herein.

FIG. 2 is a flowchart showing a method (200) of detecting fluid particle concentration, according to an example of the principles described herein. The method of FIG. 2 may begin by providing (block 201) a current, or alternatively a voltage to the electrode (101) disposed within a fluidic passageway of the fluidic die (100). An impedance may be sensed (block 202) at the electrode (101), and a particle vehicle separation level may be determined (block 203) within the fluid (150) based on the sensed impedance. As described above, the sensed impedance may be converted from a voltage or current, and the impedance may be used to determine (block 203) the particle vehicle separation level. In this manner, the PVS of the fluid within the fluidic die (100) may be determined based on the impedance value detected by the electrode (101).

In one example, the method of claim 2 may be performed during a quiescent period of the fluidic die (100). In one example, a quiescent period of the fluidic die (100) may include a steady-state (DC) voltage or current at a specified terminal of the fluidic die (100) with no input signal applied. For example, the quiescent period may be a period during when electrical noise sources such as firing currents are quiet or are not present, and when no drive bubble is present in the fluid ejection chambers (104).

Figure 3:
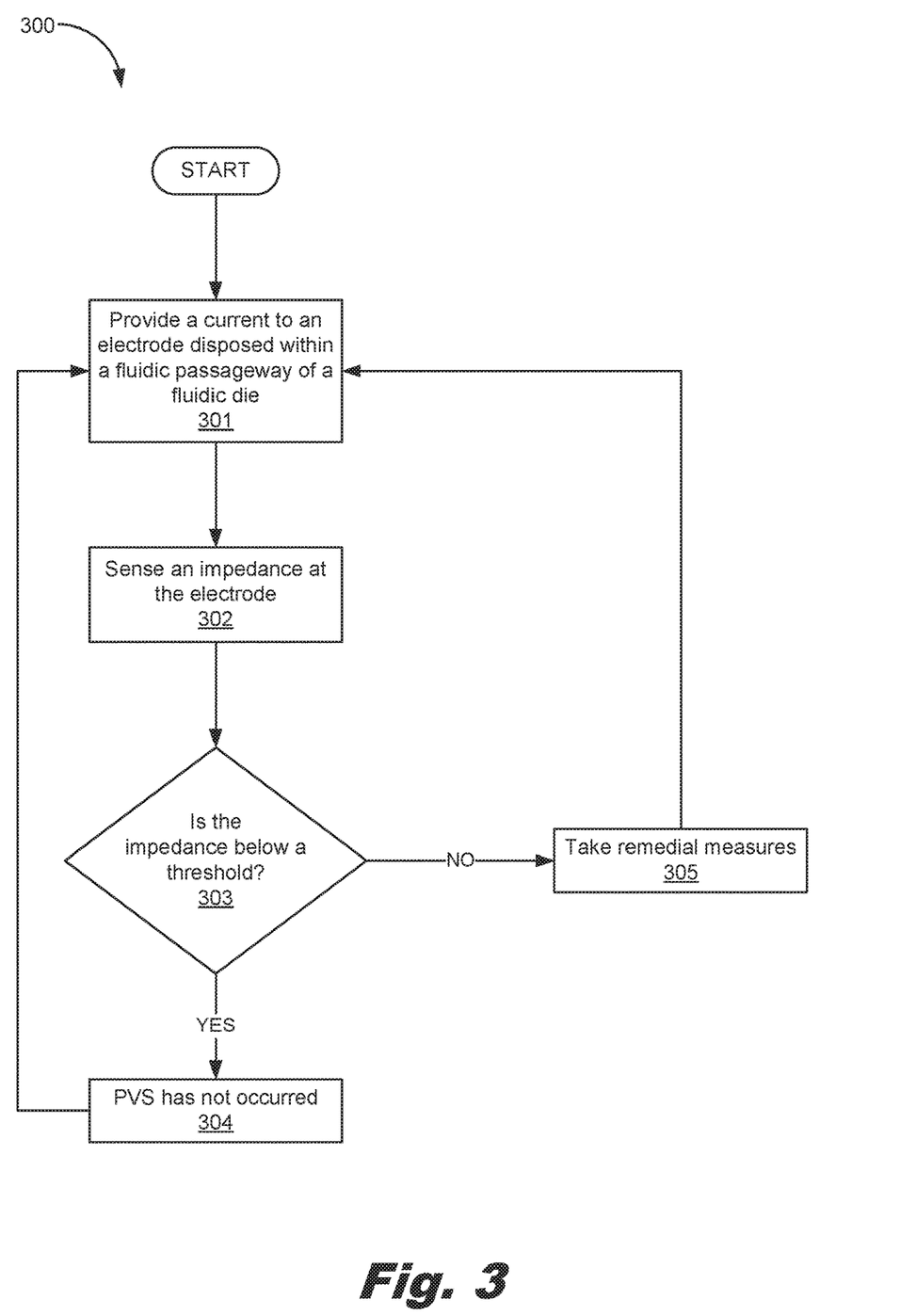
FIG. 3 is a flowchart showing a method of detecting fluid particle concentration, according to another example of the principles described herein.

FIG. 3 is a flowchart showing a method (300) of detecting fluid particle concentration, according to another example of the principles described herein. The method of FIG. 3 may begin by providing (block 301) a current, or alternatively a voltage, to the electrode (101) disposed within a fluidic passageway of the fluidic die (100). An impedance may be sensed (block 302) at the electrode (101).

The sensed voltage may be converted to an impedance, and, at block 303, it may be determined (block 303) whether the impedance is below a threshold. In one example, the threshold may be set based on a desired print quality at various levels of PVS. In other words, the threshold in this example may be based on an impedance level that results in at least a desired print quality or better. In one example, the threshold may be set by an operator of the fluidic die such that the operator may indicate a desired print quality that corresponds to an identified impedance level.

In response to a determination that the impedance is below a threshold (block 303, determination YES), particle vehicle separation (PVS) has not occurred (block 304), or PVS has not occurred to a level at which the print quality of a printed media is decreased. In one example, the method (300) may loop back to block 301 in order to allow for another fluid particle concentration detection instance to occur. This looping allows for any number of fluid particle concentration detection instance to occur.

In response to a determination that the impedance is not below (i.e., is above) a threshold (block 303, determination NO), particle vehicle separation (PVS) has occurred (block 304), or PVS has occurred to a level at which the print quality of a printed media is decreased, a number of remedial measures may be taken (block 305) to correct the PVS and increase the particle concentration to a homogeneous level. the remedial measures may include, for example, activation of a number of pumps internal and external to the fluidic die (100) to move the particles within the fluid into a homogeneous state, activation of the actuator (102) used to eject a volume of the fluid (150) from the ejection chamber (104) during, or example a spitting operation, other remedial measures, or combinations thereof. In one example, the method (300) may loop back to block 301 in order to allow for another fluid particle concentration detection instance to occur. The fluid particle concentration detection may be in connection with the same electrode (101), or may be performed in connection with a newly-selected electrode (101). This looping allows for any number of fluid particle concentration detection instance to occur.

The impedance sensed by the electrode correlates with the particle concentration within the fluid. Although an impedance below the threshold may indicate that PVS has not occurred, and an impedance above the threshold may indicate that PVS has occurred, in some systems and methods, the opposite may be true. For example, in some situations the detected voltage and determined impedance level may be used such that an impedance above the threshold may indicate that PVS has not occurred, and an impedance below the threshold may indicate that PVS has occurred.

Figure 4:
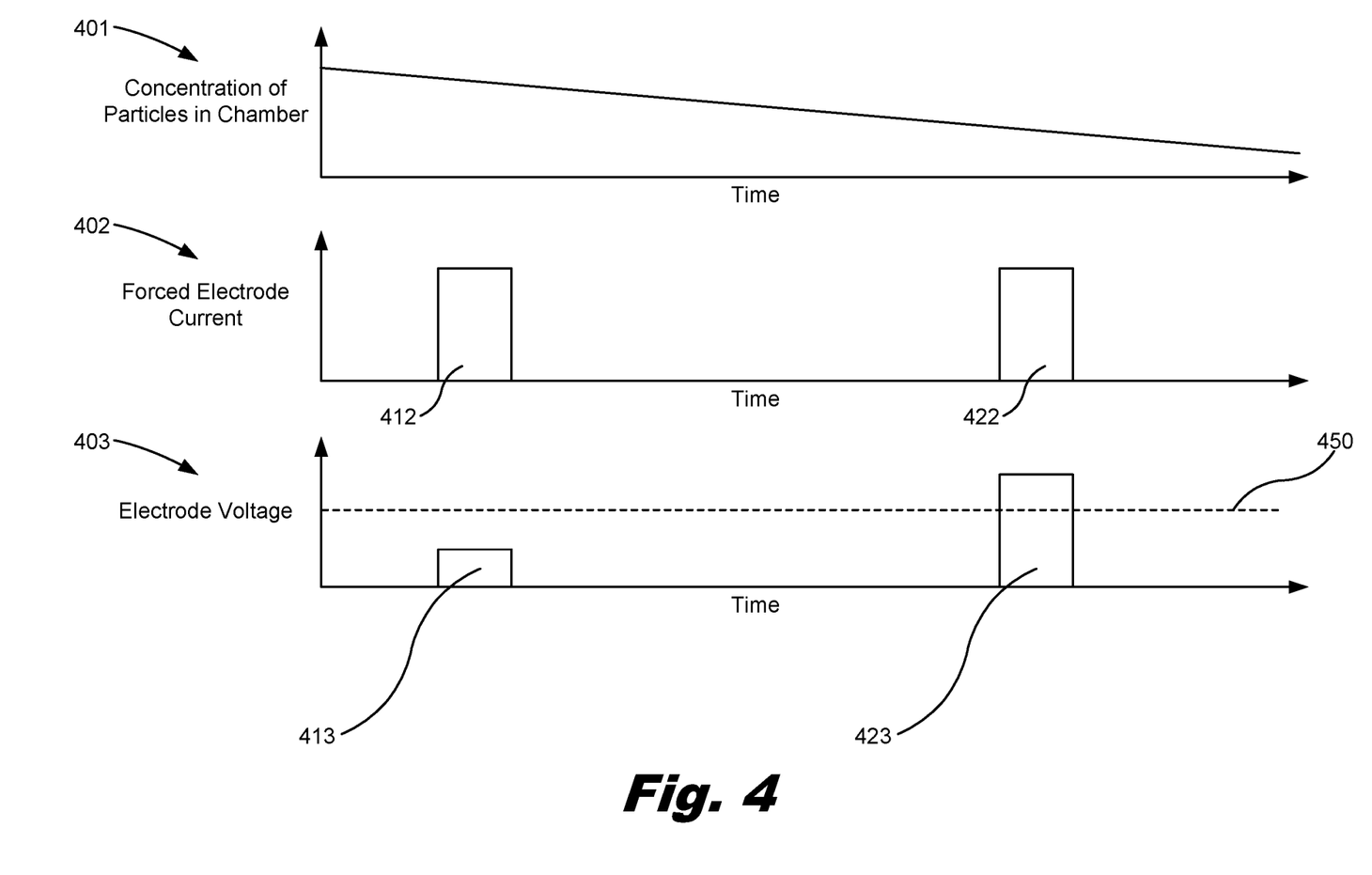
FIG. 4 depicts a number of graphs depicting the concentration of particles, forced electrode current, and electrode voltage over time, according to an example of the principles described herein.

FIG. 4 depicts a number of graphs (401, 402, 403) depicting the concentration of particles, forced electrode current, and electrode voltage over time, according to an example of the principles described herein. In graph (401), the concentration of particles in the fluid vehicle may, over time, be reduced in, for example, the fluid ejection chamber (104) as the particles move to other areas of the fluidic die (100) such as the fluid slots (106) and fluid channels (105). In this state, the fluid vehicle of the fluid may be in higher abundance relative to the particles within the fluid. As the fluid (150) within the fluidic die (100) sits without being moved within or ejected from the fluidic die (100), PVS begins to occur, and the longer the fluidic die (100) remains in this state, the greater the amount of pigments separate from the fluid vehicle.

In graphs 402 and 403, a forced electrode current is depicted as being equal in two separate instances where the forced electrode current (412) is used to detect a PVS level in a first instance, and an identical forced electrode current (422) is used to detect a PVS level in a second instance. In graph 403, during the forced electrode current (412) in the first instance of PVS detection, the electrode voltage (413) detected and the corresponding impedance level is below a PVS detection threshold (450). In this state, it is determined that PVS has not occurred (block 304), or PVS has not occurred to a level at which the print quality of a printed media is decreased. However, during the forced electrode current (422) in the second instance of PVS detection, the electrode voltage (423) detected and the corresponding impedance level is above a PVS detection threshold (450) corresponding to an unacceptable PVS state. In this state, it is determined that PVS has occurred (block 304), or PVS has occurred to a level at which the print quality of a printed media is decreased, and a number of remedial measures may be taken (block 305) to correct the PVS and increase the particle concentration to a homogeneous level. At least one remedial process may be implemented, and the remedial processes may include, for example, a micro-recirculation of the fluid (150) within the passageways of the fluidic die (100), a macro-recirculation of the fluid (150) within the passageways of the fluidic die (100), a spitting operation, an adjustment of a backpressure of the fluid (150) to pull a meniscus of the fluid (150) into the fluidic passageway, a wiping an orifice plate of the fluidic die (100), or combinations thereof. The electrode voltage (403) profiles depicted in FIG. 4 are examples, and the electrode voltage (403) profiles may be of different shape and/or magnitude than those depicted in FIG. 4. These electrode voltage (403) profiles may be assessed so as to determine particle concentration.

Figure 5:
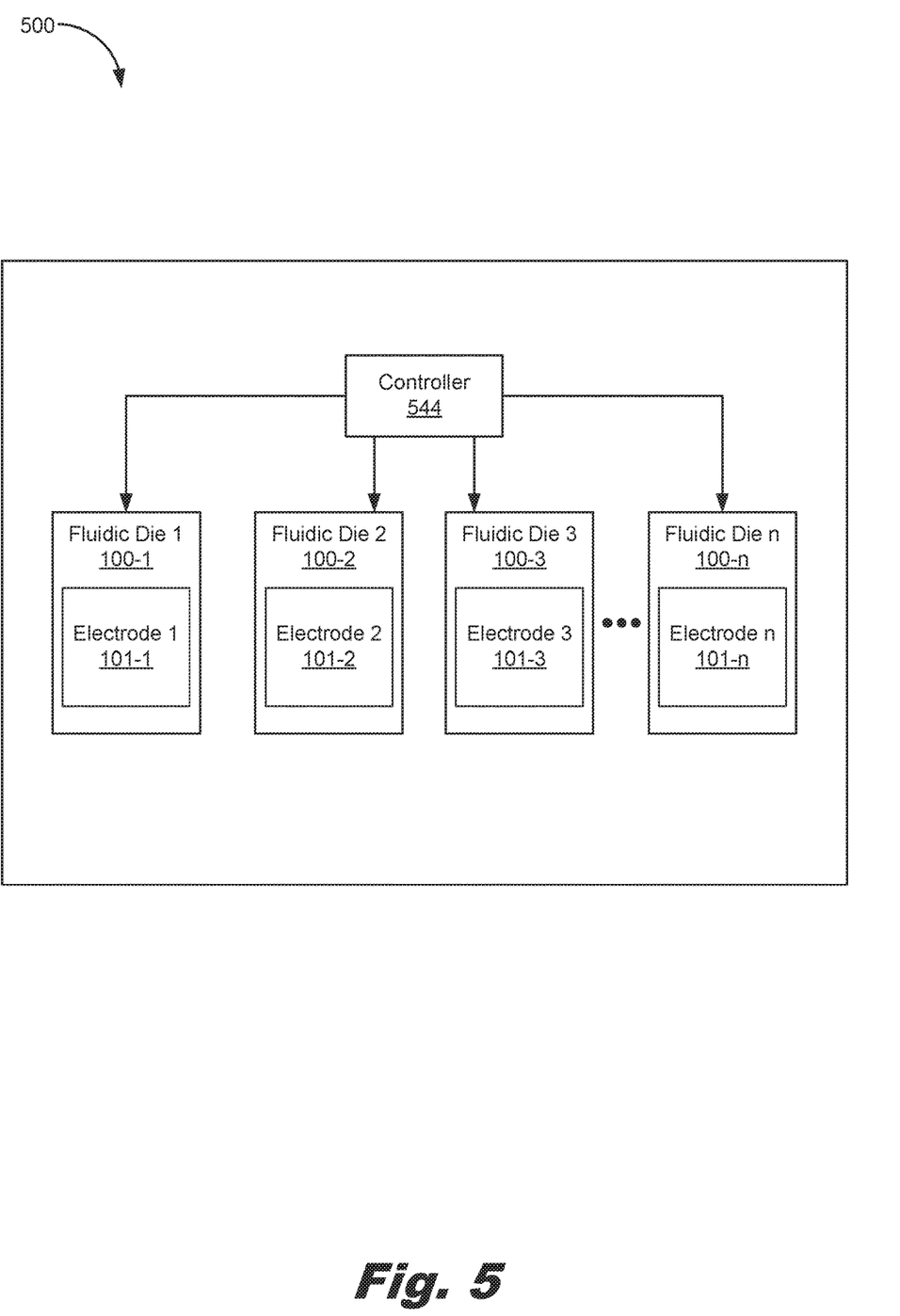
FIG. 5 is a block diagram of a printing device including a number of fluidic die, according to an example of the principles described herein.

FIG. 5 is a block diagram of a printing device (500) including a number of fluidic die (100), according to an example of the principles described herein. The printing device (500) may include a controller (544). The controller (544) represents the programming, processor(s), and associated memories, along with other electronic circuitry and components that control the operative elements of the printing device (500) and the activation of the electrode (101) used in fluid particle concentration detection. The printing device (500) may include an arrangement of fluidic ejection dies (100) for dispensing fluid onto a sheet or continuous web of paper or other print substrate. Each fluid ejection die (100-1, 100-2, 100-3, 100-n, collectively referred to herein as 100) includes a number of electrodes (101-1, 101-2, 101-3, 101-n, collectively referred to herein as 101). The ellipsis depicted between fluid ejection die 100-3 and fluid ejection die 100-n indicates that there may be any number of fluid ejection dies (100) each with any number of electrodes (101) within the printing device (500).

The controller (544) controls the activation of the electrode (101) used in fluid particle concentration detection, and includes the programming, processor(s), and associated memories to perform the methods of FIGS. 1A and 1B. For example, the controller (544) controls the timing at which the electrode (101) is activated, and may do so during a quiescent period of each fluidic die (100). Further, the controller (544) may determine a voltage at which the electrode (101) may be activated to provide a non-nucleating and non-drive-bubble-forming current through the fluid (150). Further, the controller (544) includes the programming, processor(s), and associated memories to determine a particle vehicle separation level based on a sensed voltage at the electrode (101), and convert that sensed voltage to an impedance. Even still further, the controller (544) includes the programming, processor(s), and associated memories to determine whether the impedance is above or below a threshold, and take remedial measures if it is determined that PVS has occurred based on that threshold.

Figure 6:
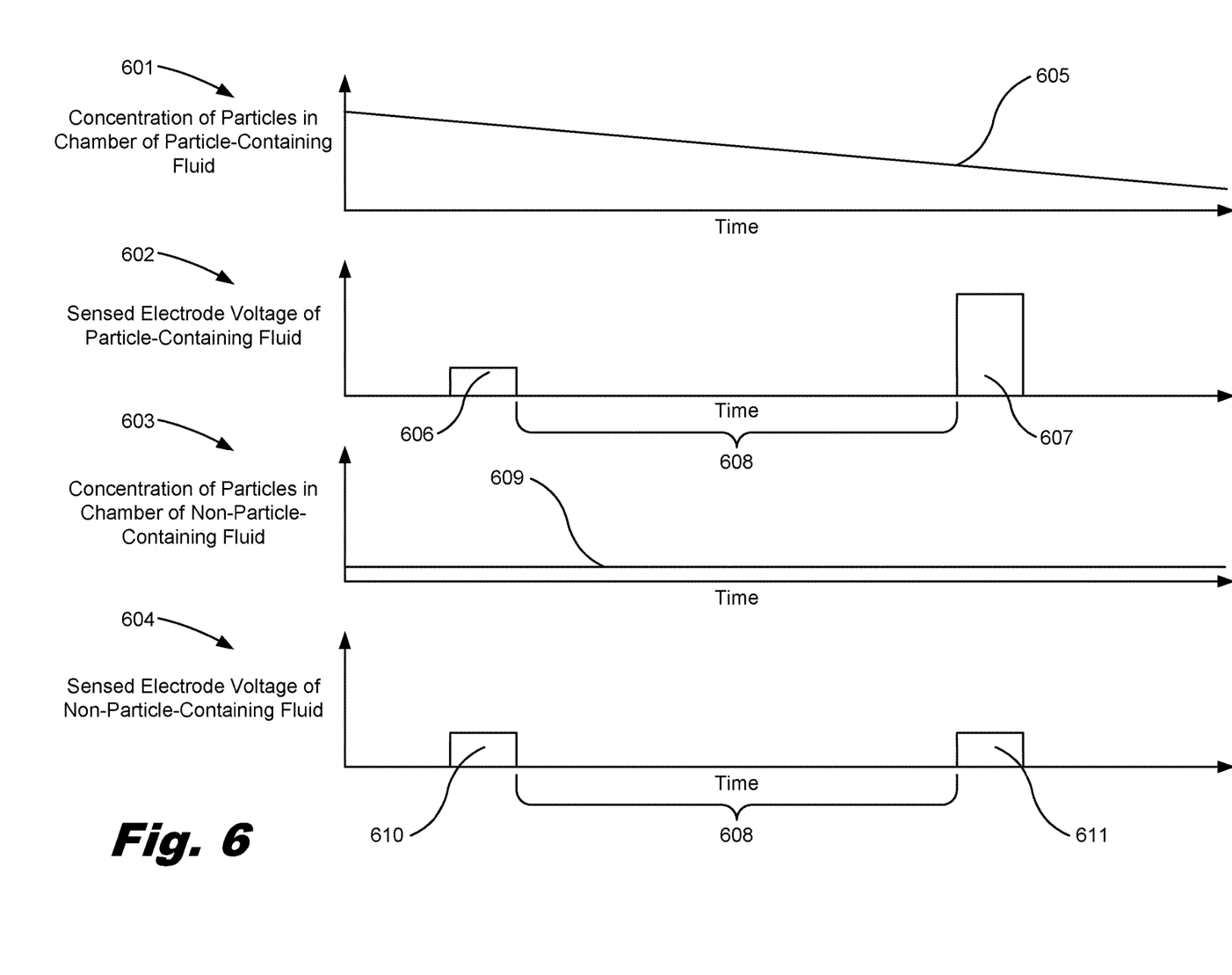
FIG. 6 depicts a number of graphs depicting the concentration of particles, forced electrode current, and sensed electrode voltage over time of particle-containing fluids and non-particle-containing fluids, according to an example of the principles described herein.

FIG. 6 depicts a number of graphs (601, 602, 603, 604) depicting the concentration of particles, forced electrode current, and sensed electrode voltage over time of particle-containing fluids and non-particle-containing fluids, according to an example of the principles described herein. In some examples, a fluidic die (100) may be able to eject a number of different types of fluids (150) including particle-containing fluids and non-particle-containing fluids. It may be desirable to be able to determine whether the fluid (150) within the fluidic die (100) is a particle-containing fluid or a non-particle-containing fluid. Further, it may be desirable to distinguish among a number of possible particle-containing fluids that may be included in the fluidic die (100). The graphs (601, 602, 603, 604) depict a manner in which such determinations may be made.

The first graph (601) and the second graph (602) depict a concentration of particles in a particle-containing fluid in, for example, the fluid ejection chambers (104) of the fluidic die (100) over time and a sensed electrode voltage, for example, of the particle-containing fluid. As PVS may occur within a particle-containing fluid over time, the first graph (601) depicts a decline in the particle concentration of the fluid (150) over time as indicated by line (605). In one example, a stirring process may be performed by the stirring actuators (115) to ensure that the fluid (150) is initially homogeneous before a first voltage (606) is sensed, and an impedance value determined. A time period (608) may exist between the first sensed voltage (606) and a second sensed (607) voltage. As depicted in the second graph (602), the particle concentration has decreased between the first sensed voltage (606) and the second sensed voltage (607) as is indicative of a decrease in particle concentration in the particle-containing fluid and an increase in particle vehicle separation.

In contrast, the third graph (603) and the fourth graph (604) depict a concentration of particles in non-particle-containing fluids in, for example, the fluid ejection chambers (104) of the fluidic die (100) over time and a sensed electrode voltage, for example, of the non-particle-containing fluid. As non-particle-containing fluids do not contain particles, PVS does not occur. This is depicted in the third graph (603) where the concentration of particles within a fluid ejection chamber (104) is detected as being constant as indicated by line (609). Further, when a current is force into a non-particle-containing fluid and a resulting voltage is detected between two separate detection instances (610, 611), the sensed impedance does not change as is expected for non-particle-containing fluids. Thus, in this manner, when a change in impedance is detected over time, the fluid (150) may be determined to be a particle-containing fluid, whereas when a change in impedance is not detected over time, the fluid (150) may be determined to be a non-particle-containing fluid.

Figure 7:
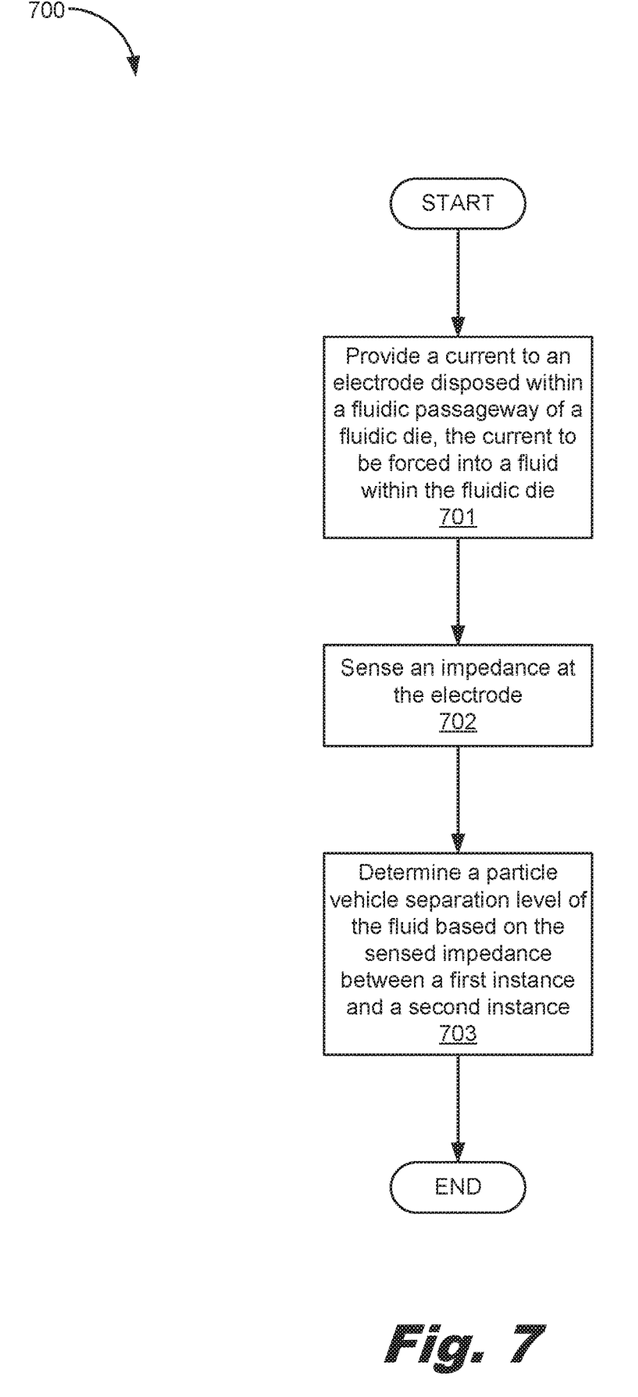
FIG. 7 is a flowchart showing a method of distinguishing between fluids, according to an example of the principles described herein.

With the description provide in connection with FIG. 6, FIG. 7 is a flowchart showing a method (700) of distinguishing between fluids (150), according to an example of the principles described herein. The method of FIG. 7 may be used to distinguish between particle-containing fluids and non-particle-containing fluid, and in distinguishing between different particle-containing fluids. The method of FIG. 7 may begin by providing (block 701) a current, or alternatively a voltage, to an electrode (101) disposed within a fluidic passageway (104, 105, 106) of a fluidic die (100). The current, or alternatively the voltage, is forced into the fluid (105) within the fluidic die (100).

An impedance is sensed (block 702) at the electrode (101), and a particle vehicle separation (PVS) level of the fluid (150) is determined based on the sensed impedance between a first instance (606, 610) and a second instance (607, 611) of electrode (101) being activated. With reference to the graphs (601, 602, 603, 604) of FIG. 6, it can be determined, based on the sensed impedances between the first instance (606, 610) and the second instance (607, 611) whether the fluid (150) is a particle-containing fluid or a non-particle-containing fluid.

Figure 8:
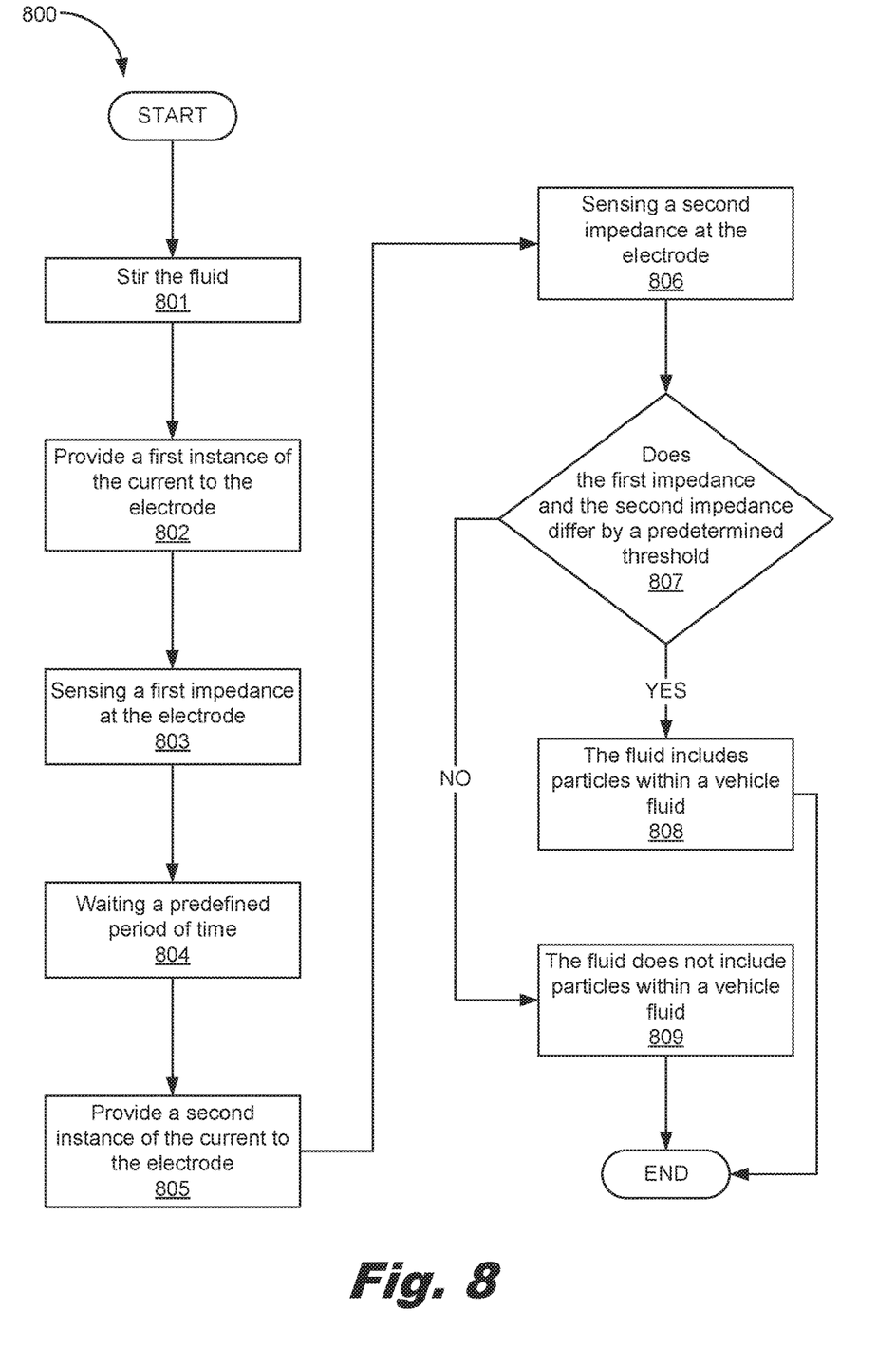
FIG. 8 is a flowchart showing a method of distinguishing between fluids, according to another example of the principles described herein.

FIG. 8 is a flowchart showing a method (800) of distinguishing between fluids (150), according to another example of the principles described herein. The method (800) of FIG. 8 may be executed by, for example, the controller (544) of the printing device (500). The method of FIG. 8 may begin by stirring (block 801) the fluid (150) within the fluidic die (100). In one example, this may be accomplished by activating the stirring actuators (115) disposed within the passageways (104, 105, 106) of the fluidic die. Stirring (block 801) the fluid (150) causes the particles within the fluid vehicle of the fluid (150) to become more homogeneous throughout the fluid (150) as a whole, and creates a baseline of homogeneity from which a level of PVS may be detected.

After the stirring process of block 801, a current, or alternatively a voltage, may be provided (block 802) to the electrode (101) in a first instance (606, 610), and a first impedance may be sensed (block 803) at the electrode (101). The method may continue with waiting (block 804) for a period of time (608). Waiting (block 804) a period of time (608) allows for the fluid (150) to undergo particle vehicle separation (PVS) if the fluid (150) is a particle-containing fluid. If the fluid (150) is not a particle-containing fluid, then no PVS will occur, and detection of the non-particle-containing fluid will be identified by the lack of change after waiting (block 804) the period of time (608). In one example, the period of time (608) may be between one second and three minutes.

After waiting (block 804) the period of time (608), a current, or alternatively a voltage, may be provided (block 805) to the electrode (101) in a second instance (607, 611), and a second impedance may be sensed (block 806) at the electrode (101). It may be determined (block 807) as to whether the first impedance sensed at block 803 differs from the second impedance sensed at block 806 by a predetermined threshold. In one example, the difference may be determined between the first impedance and the second impedance, and the difference in value may be compared to the threshold. In another example, the threshold may comprise ranges of values. In this example, a lower and upper threshold may exist for both the first impedance sensed at block 803 and the second impedance sensed at block 806, and block 807 may include checking whether the first impedance sensed at block 803 is within its upper and lower threshold, and checking whether the second impedance sensed at block 806 is within its upper and lower threshold. If the first impedance or second impedance are outside their respective ranges, but closer in value to one another, it may be determined that the fluid (150) is a non-particle-containing fluid. If the first impedance or second impedance are outside their respective ranges, but either is further away in value to the other, it may be determined that the fluid (150) is a particle-containing fluid. The threshold may be preprogrammed into control circuitry or firmware, or may be set by a user.

In response to a determination the first impedance sensed at block 803 and the second impedance sensed at block 806 differ by the predetermined threshold (block 807, determination YES), then the fluid (150) includes particles within a fluid vehicle (block 808), or, in other words, the fluid (150) is a particle-containing fluid. In response to a determination the first impedance sensed at block 803 and the second impedance sensed at block 806 do not differ by the predetermined threshold (block 807, determination NO), then the fluid (150) does not include particles within a fluid vehicle (block 809), or, in other words, the fluid (150) is a non-particle-containing fluid. The method may then terminate, or, in another example, the method may loop back to block 801 to perform another distinguishing of the fluid (150).

Figure 9:
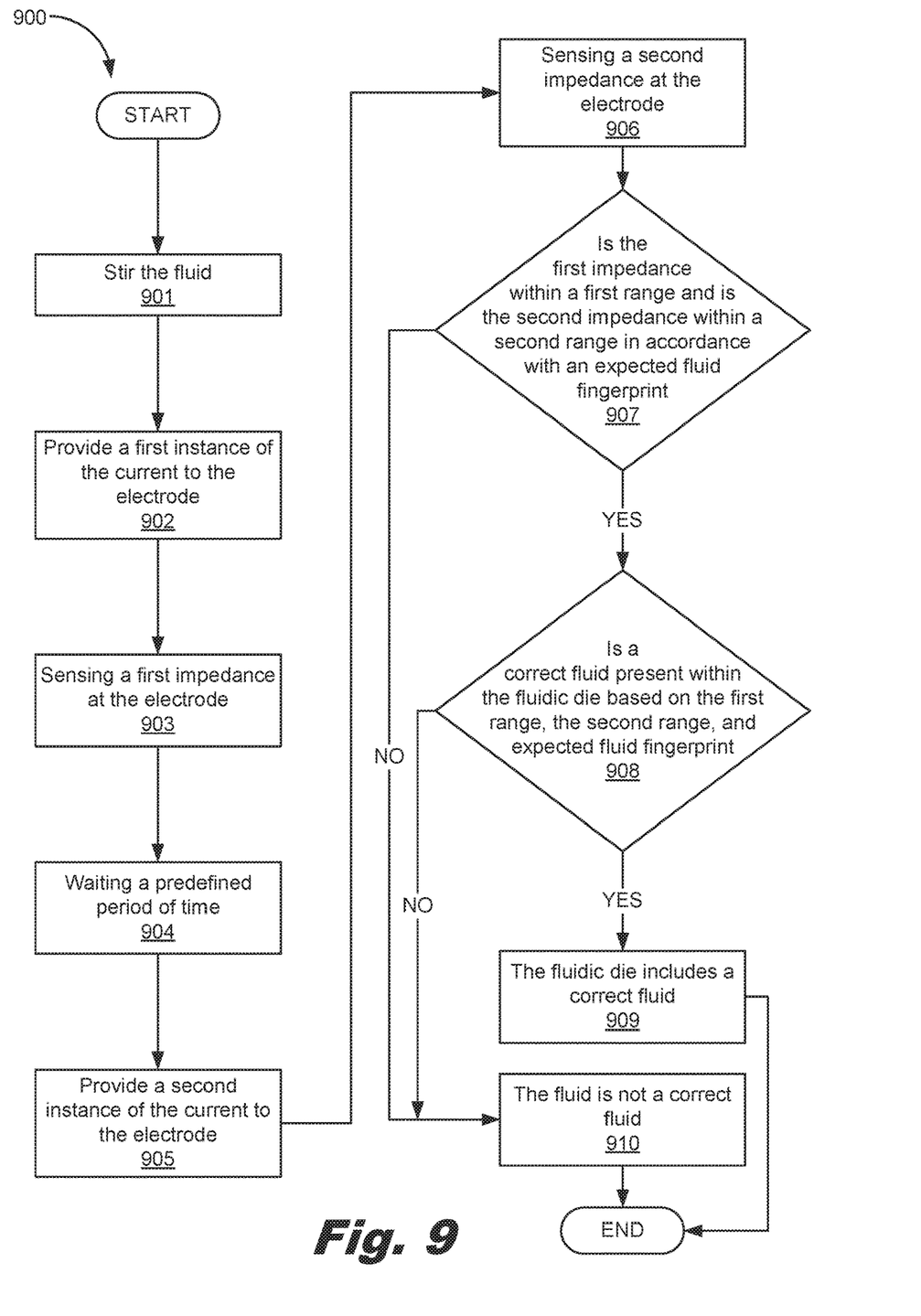
FIG. 9 is a flowchart showing a method of distinguishing between fluids, according to another example of the principles described herein.

FIG. 9 is a flowchart showing a method (900) of distinguishing between fluids, according to another example of the principles described herein. The method (900) of FIG. 9 may be executed by, for example, the controller (544) of the printing device (500). The method (900) of FIG. 9 may be used to distinguish between different particle-containing fluids, and may be used alone or in addition to the method (800) of FIG. 8 to distinguish between particle-containing fluids and non-particle-containing fluids and to distinguish between different particle containing fluids. Blocks 901 through 906 are similar to blocks 801 through 806 of FIG. 8, and the description of these blocks is provided herein in connection with blocks 801 through 806 of FIG. 8.

At block 907, it may be determined whether the first impedance sensed at block 903 is within a first range of impedance values, and whether the second impedance sensed at block 806 is within a second range of impedance values in accordance with an expected fluid fingerprint. Different pigment-containing fluids may include different particle mobility properties where the particles within the different fluids may have a lower or higher propensity to move out of a homogeneous state within the fluid. The fluid fingerprint may be defined as an identified level of particle vehicle separation using the sensed first (606, 610) and second (607, 611) currents and their respective impedance values after the period of time (608). Each particle-containing fluid may demonstrate different values of impedance before and after the period of time (608) that serves as a type of fluid fingerprint that is unique to a particular particle-containing fluid. Thus, a fluid fingerprint may be identified for a particular particle-containing fluid. The ranges of the sensed first (606, 610) and second (607, 611) currents may be tuned to be able to adequately distinguish between particle-containing fluids that may have similar or overlapping ranges of first (606, 610) and second (607, 611) currents and resulting fluid fingerprints.

In response to a determination that the first impedance sensed at block 903 is not within a first range of impedance values, and/or the second impedance sensed at block 806 is not within a second range of impedance values in accordance with an expected fluid fingerprint (block 907, determination NO), it may be determined that the fluid (150) within the fluidic die (100) is not a correct fluid (block 910). In some instances, a user of a fluid die (100) may be able to provide the fluidic die (100) with a fluid that is not a correct fluid. For example, a non-approved fluid such as a fluid that is of an inferior quality or has a number of inappropriate qualities may be introduced into the fluidic die (100), and may not function in the fluidic die (100) appropriately, may harm elements of the fluidic die (100), or may produce an inferior product such as an inferior printed media. Thus, in order to ensure highest functionality and quality, the method (900) of FIG. 9 may be used to identify incorrect fluids (150) within the fluidic die (100).

In response to a determination that the first impedance sensed at block 903 is within a first range of impedance values, and whether the second impedance sensed at block 806 is within a second range of impedance values in accordance with an expected fluid fingerprint (block 907, determination YES). It may then be determined whether a correct fluid is present within the fluidic die (100) based on the first range of impedance values, the second range of impedance values, and the expected fluid fingerprint (block 908). In response to a determination that the correct fluid is not present within the fluidic die (100) based on the first range of impedance values, the second range of impedance values (block 908, determination NO), then it may be determined that the fluid (150) within the fluidic die (100) is not a correct fluid (block 910). In response to a determination that the correct fluid is present within the fluidic die (100) based on the first range of impedance values, the second range of impedance values (block 908, determination YES), then it may be determined that the fluid (150) within the fluidic die (100) is a correct fluid (block 909). In this manner, a fluid fingerprint derived from the sensed first (606, 610) and second (607, 611) currents and their respective impedance values, and the predefined period of time (608) may be used to identify a particular fluid (150) within the fluidic die (100).

Figure 10:
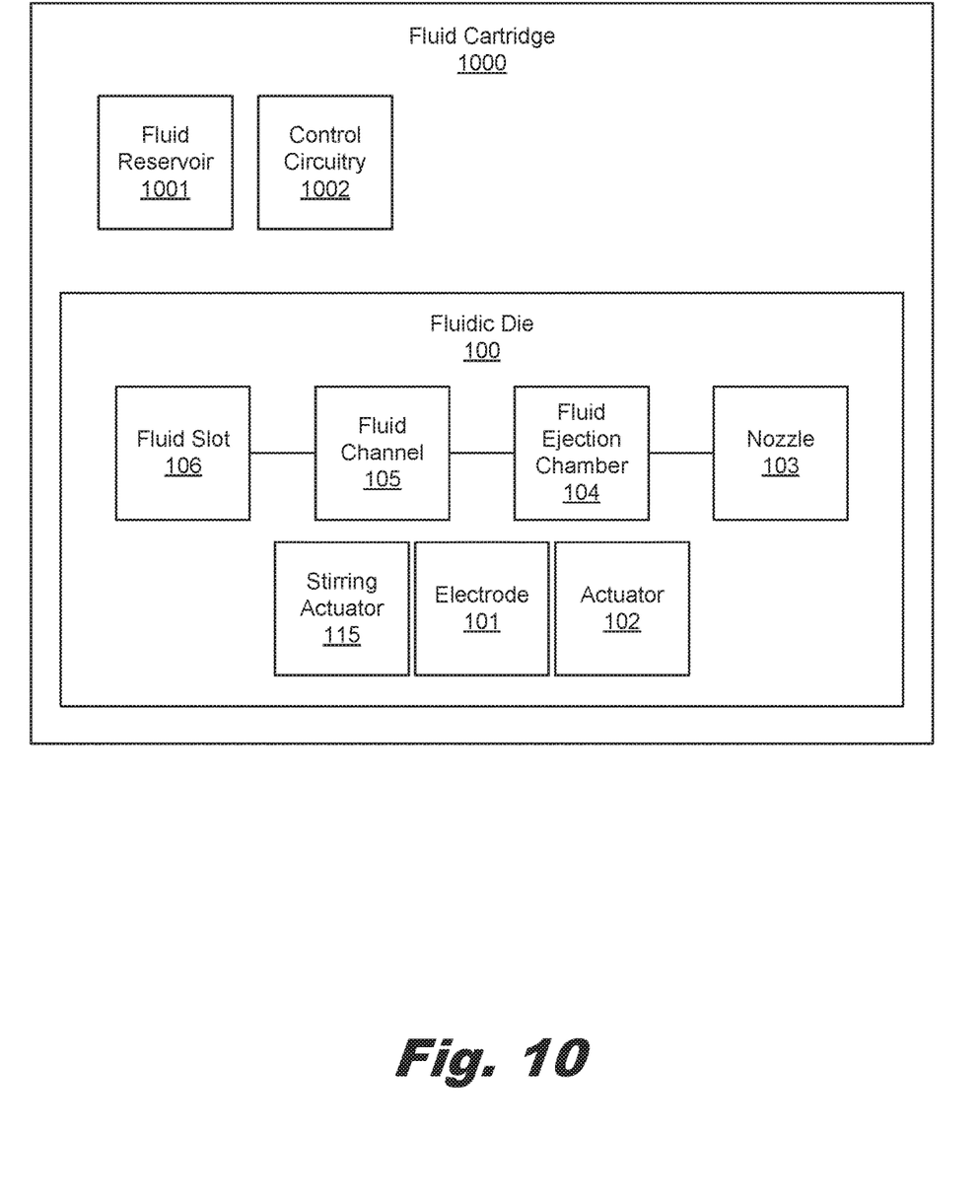
FIG. 10 is a block diagram of a fluidic cartridge, according to an example of the principles described herein.

FIG. 10 is a block diagram of a fluidic cartridge (1000), according to an example of the principles described herein. The fluidic cartridge (1000) may include a fluid reservoir (1001) for storing a volume of fluid (150), a fluidic die (100) fluidically coupled to the fluid reservoir (1001), an electrode (101) disposed within a fluidic passageway (104, 105, 106) of the fluidic die (100), and control circuitry (1002). The control circuitry (1002) may activate the electrode (101) within the fluidic die (100), and determine a particle vehicle separation level of the fluid (150) based on the sensed impedance between a first instance and a second instance. The impedance sensed at the electrode corresponds to a dispersion level of a solid within a fluid vehicle of the fluid (150). The fluidic passageway (104, 105, 106) is a fluid ejection chamber (104), a fluid channel (105), a fluid slot (106), or combinations thereof. The fluidic cartridge (1000) may include a stirring device (115) to stir the fluid (150) within the fluidic die (100) before the first instance. In response to a determination that the first impedance differs from the second impedance by a predetermined threshold, it may be determined that the fluid (150) includes particles within a vehicle fluid. In response to a determination that the first impedance does not differ from the second impedance by a predetermined threshold, it may be determined that the fluid (105) does not include particles within a vehicle fluid.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the printer controller (544) of the printing device (500) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of distinguishing between fluids may include providing a current to an electrode disposed within a fluidic passageway of a fluidic die, the current to be forced into a fluid within the fluidic die, sensing an impedance at the electrode, and determining a particle vehicle separation level of the fluid based on the sensed impedance between a first instance and a second instance. The specification and figures also describe a fluidic device including a fluidic die including an electrode disposed in a fluid passageway of the fluidic die, and a controller. The controller senses an impedance at the electrode, and determines a particle vehicle separation level of a fluid within the fluidic die based on the sensed impedance between a first instance and a second instance. The fluid distinguishing devices and methods described herein may distinguish between types of fluids within a fluidic die in order to determine if a correct fluid is being used in the fluidic die.

The preceding description has been presented to illustrate and describe examples of the principles described. This description is not intended to be exhaustive or to limit these principles to any precise form disclosed. Many modifications and variations are possible in light of the above teaching.

What is claimed is:
1. A fluidic device comprising:
a fluidic die comprising an electrode disposed in a fluid passageway of the fluidic die; and
a controller to:
sense an impedance at the electrode; and
determine a particle vehicle separation level of a fluid within the fluidic die based on the sensed impedance between a first instance and a second instance.
2. The fluidic device of claim 1, comprising:
a stirring actuator to stir the fluid;
wherein the controller:
stirs the fluid with the stirring actuator;
transmits a first instance of a current to the electrode;
senses a first impedance at the electrode;
waits a predefined period of time;
transmits a second instance of the current to the electrode;
senses a second impedance at the electrode; and
determines whether the first impedance and the second impedance differ by a predetermined threshold.
3. The fluidic device of claim 2, wherein the controller:
in response to a determination that the first impedance differs from the second impedance by the predetermined threshold, determines that the fluid comprises particles within a vehicle fluid; and
in response to a determination that the first impedance does not differ from the second impedance by the predetermined threshold, determines that the fluid does not comprise particles within a vehicle fluid.

4. The fluidic device of claim 1, comprising:
a stirring actuator to stir the fluid;
wherein the controller:
stirs the fluid with the stirring actuator;
transmits a first instance of a current to the electrode;
senses a first impedance at the electrode;
waits a predefined period of time;
transmits a second instance of the current to the electrode;
senses a second impedance at the electrode; and
determines whether the first impedance is within a first range and the second impedance is within a second range in accordance with an expected fluid fingerprint; and
determines whether a correct fluid is present within the fluidic die based on the first range, second range and the expected fluid fingerprint.

5. The fluidic device of claim 1, wherein the particle vehicle separation level of the fluid is defined by an impedance value based on the sensed impedance, and wherein:
a relatively lower impedance corresponds to a higher particle concentration within the fluid; and
a relatively higher impedance corresponds to a lower particle concentration within the fluid.

6. A method of a fluidic die, comprising:
providing a current to an electrode disposed within a fluidic passageway of a fluidic die, the current to be forced into a fluid within the fluidic die;
sensing an impedance at the electrode; and
determining a particle vehicle separation level of the fluid based on the sensed impedance between a first instance and a second instance.

7. The method of claim 6, wherein determining the particle vehicle separation level of the fluid based on the sensed impedance between a first instance and a second instance comprises:
stirring the fluid;
providing a first instance of the current to the electrode;
sensing a first impedance at the electrode;
waiting a predefined period of time;
providing a second instance of the current to the electrode;
sensing a second impedance at the electrode; and
determining whether the first impedance and the second impedance differ by a predetermined threshold.

8. The method of claim 7, wherein:
in response to a determination that the first impedance differs from the second impedance by a predetermined threshold, determining that the fluid comprises particles within a vehicle fluid; and
in response to a determination that the first impedance does not differ from the second impedance by a predetermined threshold, determining that the fluid does not comprise particles within a vehicle fluid.

9. The method of claim 6, wherein the method is performed during a quiescent period of the fluidic die.

10. The method of claim 6, wherein determining the particle vehicle separation level of the fluid based on the sensed impedance between a first instance and a second instance comprises:
stirring the fluid;
providing a first instance of the current to the electrode;
sensing a first impedance at the electrode;
waiting a predefined period of time;
providing a second instance of the current to the electrode;
sensing a second impedance at the electrode;
determining whether the first impedance is within a first range and the second impedance is within a second range in accordance with an expected fluid fingerprint;
determining whether a correct fluid is present within the fluidic die based on the first range, second range and the expected fluid fingerprint.

11. The method of claim 6, wherein the particle vehicle separation level of the fluid is defined by an impedance value based on the sensed impedance, and wherein:
a relatively lower impedance corresponds to a higher particle concentration within the fluid; and
a relatively higher impedance corresponds to a lower particle concentration within the fluid.

12. A fluidic cartridge, comprising:
a fluid reservoir for storing a volume of fluid;
a fluidic die fluidically coupled to the fluid reservoir;
an electrode disposed within a fluidic passageway of the fluidic die;
control circuitry to:
activate the electrode within the fluidic die; and
determine a particle vehicle separation level of the fluid based on the sensed impedance between a first instance and a second instance;
wherein the impedance sensed at the electrode is proportional to a dispersion level of a solid within a fluid vehicle of the fluid.

13. The fluidic cartridge of claim 12, wherein the fluidic passageway is a fluid ejection chamber, a fluid channel, or combinations thereof.

14. The fluidic cartridge of claim 12, comprising a stirring device to stir the fluid within the fluidic die before the first instance.

15. The fluidic cartridge of claim 12, wherein:
in response to a determination that the first impedance differs from the second impedance by a predetermined threshold, determining that the fluid comprises particles within a vehicle fluid; and
in response to a determination that the first impedance does not differ from the second impedance by a predetermined threshold, determining that the fluid does not comprise particles within a vehicle fluid.

* * * * *